United States Patent
Choi

(10) Patent No.: US 10,139,661 B2
(45) Date of Patent: Nov. 27, 2018

(54) DISPLAY DEVICE

(71) Applicant: SAMSUNG DISPLAY CO., LTD., Yongin-si, Gyeonggi-Do (KR)

(72) Inventor: Jonghyeon Choi, Pyeongtaek-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/486,472

(22) Filed: Apr. 13, 2017

(65) Prior Publication Data

US 2017/0299913 A1    Oct. 19, 2017

(30) Foreign Application Priority Data

Apr. 18, 2016 (KR) .................. 10-2016-0047082

(51) Int. Cl.
*G02F 1/1333* (2006.01)
*F21V 8/00* (2006.01)

(52) U.S. Cl.
CPC ..... *G02F 1/133308* (2013.01); *G02B 6/0088* (2013.01); *G02F 2001/133314* (2013.01); *G02F 2001/133331* (2013.01); *G02F 2202/28* (2013.01)

(58) Field of Classification Search
CPC ... G02F 1/133308; G02F 2001/133314; G02F 2001/133331
USPC ................. 362/97.1, 632, 633, 634
See application file for complete search history.

(56) References Cited

U.S. PATENT DOCUMENTS

| 2007/0157487 | A1 | 7/2007 | Hyun et al. |
| 2012/0300434 | A1* | 11/2012 | Tien .................. G02F 1/133308 362/97.1 |
| 2016/0363801 | A1* | 12/2016 | Jung .................... G02B 6/0086 |

FOREIGN PATENT DOCUMENTS

| KR | 1020130087341 | 8/2013 |
| KR | 1020130142297 | 12/2013 |
| KR | 101429488 | 8/2014 |

* cited by examiner

*Primary Examiner* — Laura Tso
(74) *Attorney, Agent, or Firm* — F. Chau & Associates, LLC

(57) ABSTRACT

A display device includes a display panel having a display area which displays an image and a non-display area positioned around the display area. The display device further includes a backlight assembly which emits light towards the display panel, and a housing member which houses the backlight assembly. The display device additionally includes a cover member having an opening portion corresponding to the display area, and which covers a portion of the display panel, and a mold frame coupled to the housing member. The display panel is bonded to the cover member, and at least a portion of the cover member is disposed in a space between the housing member and the mold frame, to couple the cover member to the housing member and the mold frame.

20 Claims, 13 Drawing Sheets

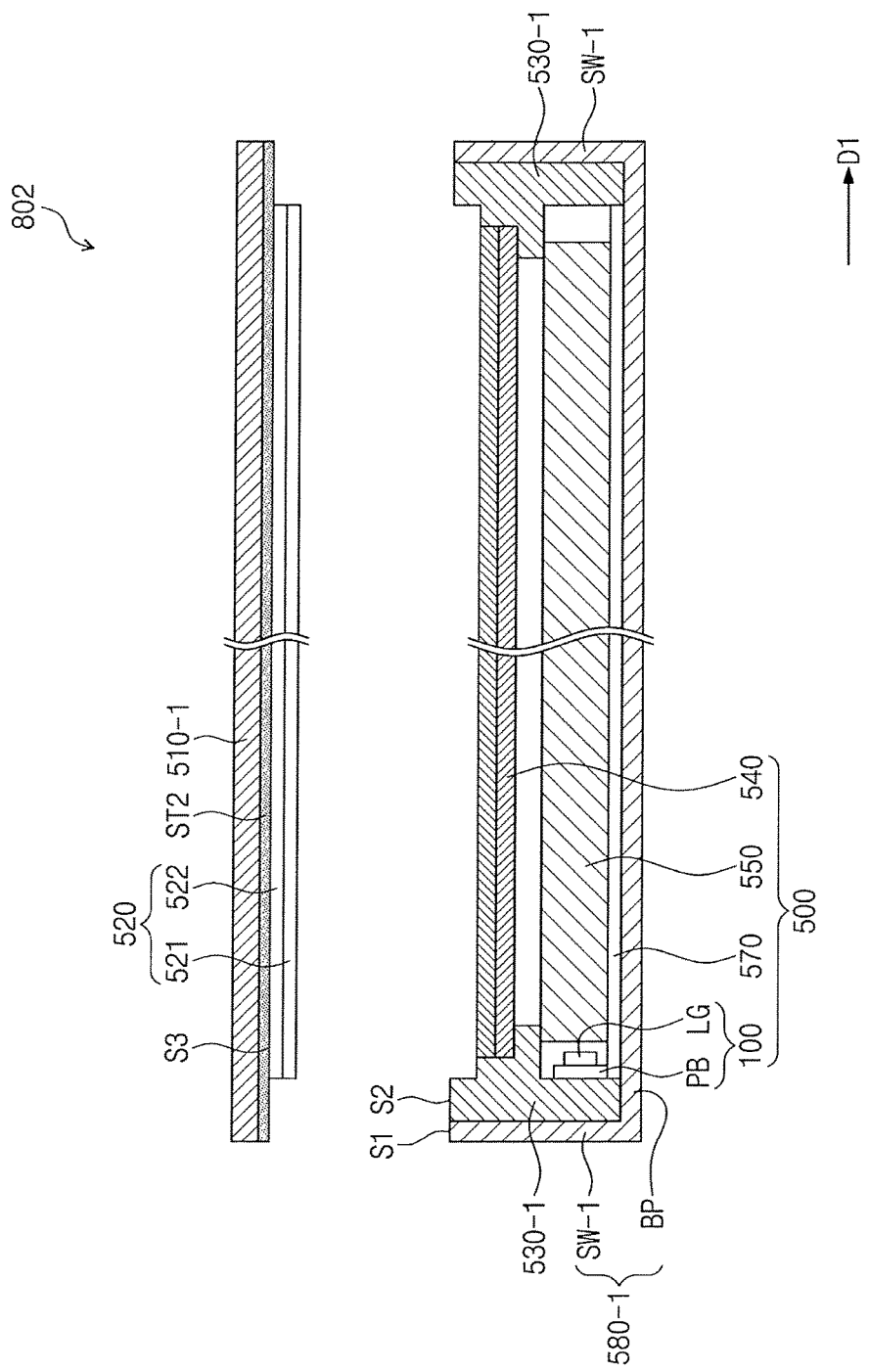

DISPLAY DEVICE

CROSS-REFERENCE TO RELATED APPLICATION

This U.S. non-provisional patent application claims priority under 35 U.S.C. § 119 to Korean Patent Application No. 10-2016-0047082 filed on Apr. 18, 2016, the disclosure of which is incorporated by reference herein in its entirety.

TECHNICAL FIELD

The present inventive concept relates to a display device.

DISCUSSION OF THE RELATED ART

Various display devices are currently being used in portable information processing apparatuses such as tablet personal computers (PCs), smartphones, and notebook PCs. Methods of increasing display quality of the display devices as well as methods of reducing volume and weight of the display devices are being developed.

SUMMARY

According to an exemplary embodiment of the present inventive concept, a display device includes a display panel having a display area for displaying an image and a non-display area positioned around the display area. The display device further includes a backlight assembly for emitting light towards the display panel, and a housing member for housing the backlight assembly. The display device additionally includes a cover member having an opening portion corresponding to the display area and for covering a portion of the display panel, and a mold frame coupled to the housing member. The display panel is bonded to the cover member, and at least a portion of the cover member is disposed in a space between the housing member and the mold frame, to couple the cover member to the housing member and the mold frame.

In an exemplary embodiment of the present inventive concept, the display device further includes an adhesive member disposed between the display panel and the cover member to bond the display panel to the cover member.

In an exemplary embodiment of the present inventive concept, the housing member includes a bottom portion and a sidewall portion connected to the bottom portion. The cover member includes a cover portion covering the non-display area of the display panel, and a coupling portion connected to the cover portion, extending towards the bottom portion of the housing member, and coupled to the sidewall portion.

In an exemplary embodiment of the present inventive concept, the adhesive member bonds a portion of the display panel corresponding to the non-display area to a surface of the cover portion.

In an exemplary embodiment of the present inventive concept, the coupling portion is disposed in the space between the housing member and the mold frame. The space is between the sidewall portion of the housing member and the mold frame.

In an exemplary embodiment of the present inventive concept, one of the coupling portion of the cover member and the sidewall portion of the housing member includes a coupling protrusion, and the other one of the coupling portion of the cover member and the sidewall portion of the housing member has a coupling groove for receiving the coupling protrusion.

In an exemplary embodiment of the present inventive concept, one of the coupling portion of the cover member and the mold frame includes a coupling protrusion, and the other one of the coupling portion of the cover member and the mold frame has a coupling groove for receiving the coupling protrusion.

In an exemplary embodiment of the present inventive concept, the sidewall portion of the housing member, the coupling portion of the cover member, and the mold frame are sequentially arranged along a longitudinal direction of the display panel when viewed in a cross section.

In an exemplary embodiment of the present inventive concept, when viewed in a cross section, the cover portion of the cover member extends along a longitudinal direction of the display panel and the cover portion of the cover member is disposed on an end of each of the sidewall portion and the mold frame.

According to an exemplary embodiment of the present inventive concept, a display device includes a display panel having a display area which displays an image and a non-display area adjacent to the display area. The display device further includes a backlight assembly for emitting light towards the display panel, a housing member for housing the backlight assembly, and a cover member having an opening portion corresponding to the display area and covering a portion of the display area. The display device further includes a mold frame coupled to the housing member. The display panel is bonded to the cover member, the cover member is bonded to the housing member and the mold frame and is coupled to the housing member and the mold frame.

In an exemplary embodiment of the present inventive concept, the display device further includes an adhesive member disposed between each of the display panel, the housing member, the mold frame, and the cover member.

In an exemplary embodiment of the present inventive concept, the housing member includes a base portion, and a sidewall portion extending towards the cover member from the base portion. The cover member covers the non-display area of the display panel.

In an exemplary embodiment of the present inventive concept, the adhesive member bonds a portion of the display panel corresponding to the non-display area to a first surface of the cover member.

In an exemplary embodiment of the present inventive concept, the cover member covers an end of the sidewall portion of the housing member and an end of the mold frame.

In an exemplary embodiment of the present inventive concept, the adhesive member bonds a first surface of the sidewall portion of the housing member to the first surface of the cover member, and the adhesive member bonds a first surface of the mold frame to the first surface of the cover member.

In an exemplary embodiment of the present inventive concept, a first surface of the display panel, the first surface of the sidewall portion, and the first surface of the mold frame are located on the same plane when viewed in a cross section.

In an exemplary embodiment of the present inventive concept, the cover member has a flat shape along a longitudinal direction of the display panel.

According to an exemplary embodiment of the present inventive concept, a display device includes a display panel having a display area and a non-display area, a housing member, and a backlight assembly disposed in the housing member. The display device further includes a cover member including a cover portion and coupling portion. The cover portion overlaps edges of the display panel and includes an opening, and the coupling portion connected to and extended away from the cover portion. The display device additionally includes a mold frame disposed in the housing member. The coupling portion is disposed between the housing member and the mold frame to couple the housing member to the mold frame.

In an exemplary embodiment of the present inventive concept, the display panel is exposed through the opening in the cover portion of the cover member.

In an exemplary embodiment of the present inventive concept, the coupling portion includes a first coupling protrusion and a second coupling protrusion, the housing member includes a first coupling groove, and the mold frame includes a second coupling groove. The first coupling protrusion is configured to be disposed in the first coupling groove and the second coupling protrusion is configured to be disposed in the second coupling groove.

BRIEF DESCRIPTION OF THE DRAWINGS

The above and other features of the present inventive concept will become more apparent by describing in detail exemplary embodiments thereof, with reference to the accompanying drawings, in which:

FIG. 7A is an exploded cross-sectional view of a cover member, a housing member and a mold frame of a display device according to an exemplary embodiment of the present inventive concept;

DETAILED DESCRIPTION OF THE EMBODIMENTS

Figure 1:
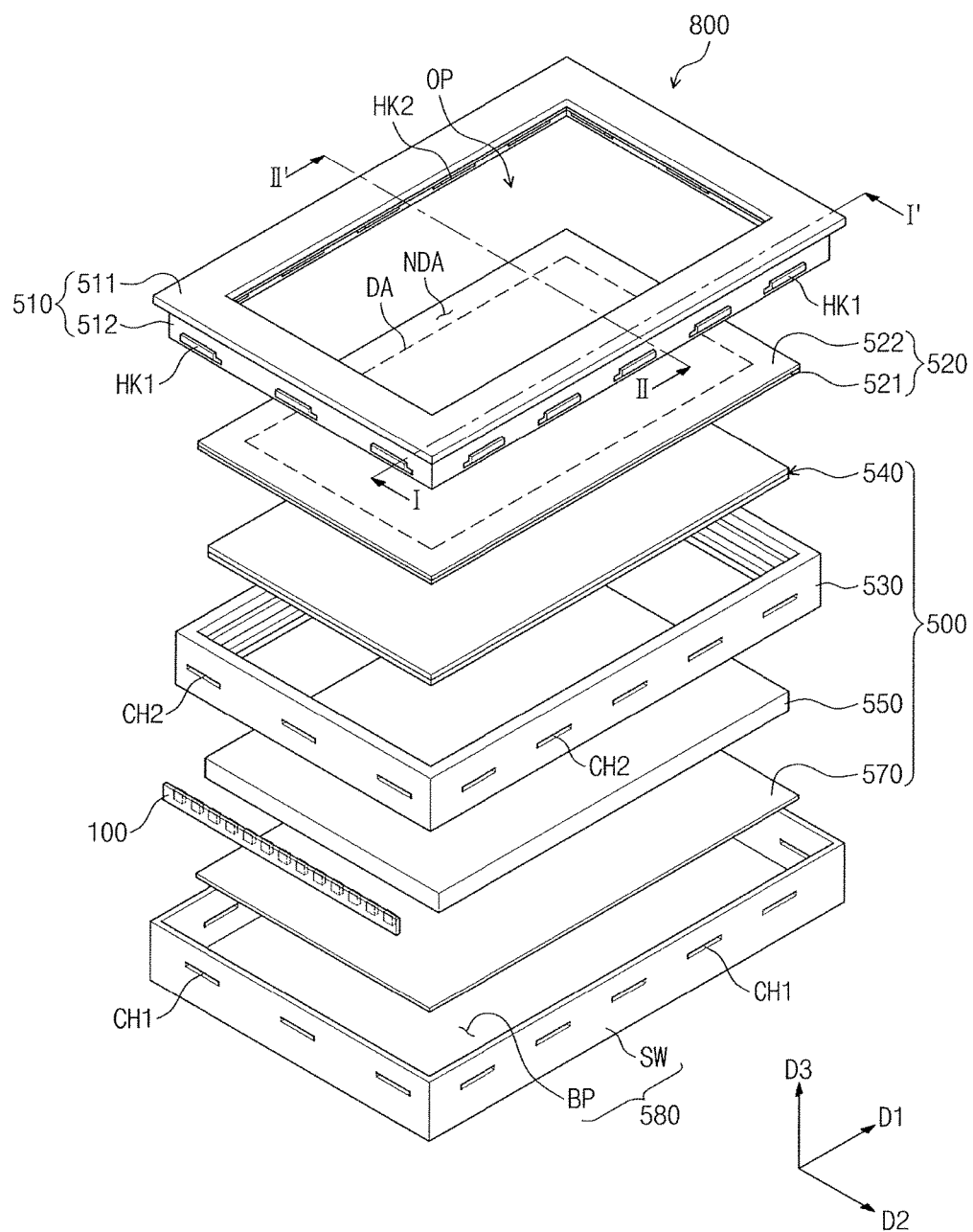
FIG. 1 is a perspective exploded view of a display device according to an exemplary embodiment of the present inventive concept.

Exemplary embodiments of the present inventive concept will be described more fully hereinafter with reference to the accompanying drawings. It is to be understood that the present inventive concept may, however, be embodied in different forms and thus should not be construed as being limited to the exemplary embodiments set forth herein. In the figures, like reference numerals may refer to like elements.

Figure 2A:
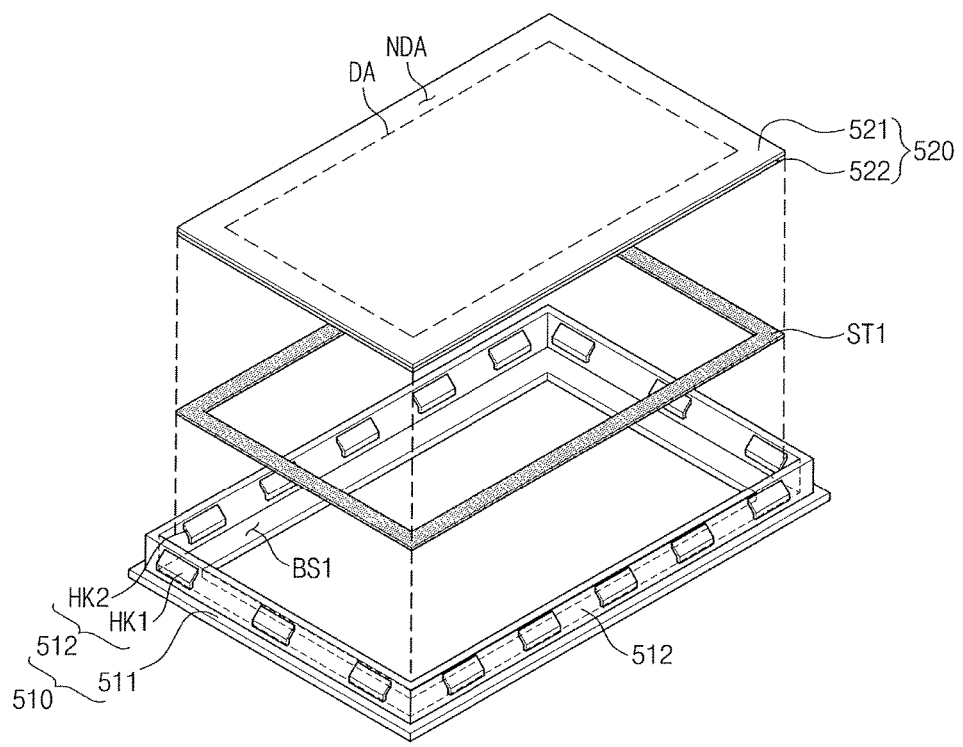
FIG. 2A is a perspective exploded view between a display panel and a cover member of FIG. 1 according to an exemplary embodiment of the present inventive concept.
Figure 2B:
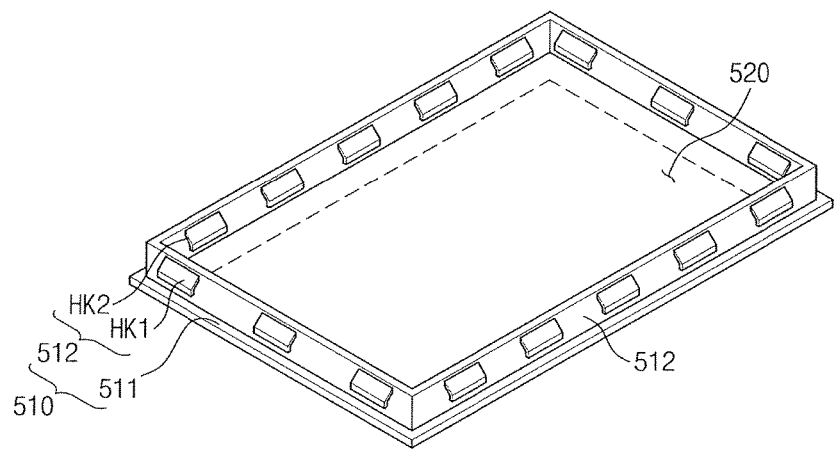
FIG. 2B is a view showing a coupling state between the display panel and the cover member illustrated in FIG. 2A according to an exemplary embodiment of the present inventive concept.

FIG. 1 is a perspective exploded view of a display device 800 according to an exemplary embodiment of the present inventive concept. FIG. 2A is a perspective exploded view between a display panel 520 and a cover member 510 of FIG. 1 according to an exemplary embodiment of the present inventive concept. FIG. 2B is a view showing a coupling state between the display panel 520 and the cover member 510 illustrated in FIG. 2A according to an exemplary embodiment of the present inventive concept.

Referring to FIGS. 1, 2A and 2B, the display device 800 includes the display panel 520, a housing member 580, a backlight assembly 500, a mold frame 530, the cover member 510, and an adhesive member ST1.

The display panel 520 has a display area DA and a non-display area NDA surrounding the display area DA. The display panel 520 displays an image in the display area DA. The non-display area NDA may be disposed at the periphery of the display area DA.

In the present embodiment, the display panel 520 may be a liquid crystal display panel and the display panel 520 may receive light emitted from the backlight assembly 500 to display the image. The display panel 520 includes a first display substrate 521, a second display substrate 522, and a liquid crystal display layer interposed between the first and second display substrates 521 and 522.

In the present embodiment, the first display substrate 521 may include multiple pixel electrodes corresponding to the display area DA, and the second display substrate 522 may include a common electrode facing the multiple pixel electrodes with the liquid crystal display layer disposed in-between. However, the inventive concept is not limited to the aforementioned structure of the pixel electrodes and the common electrode of the display panel 520. For example, in an exemplary embodiment of the present inventive concept, the first display substrate 521 may include multiple pixel electrodes corresponding to the display area DA and a common electrode spaced apart from the multiple pixel electrodes. In this case, liquid crystal molecules of the liquid crystal layer may operate in a plane-to-line switching (PLS) mode with respect to an electric field between each of the multiple pixel electrodes and the common electrode.

The housing member 580 has a bottom portion BP and multiple sidewall portions SW connected to the bottom portion BP. A housing space is provided between the multiple sidewall portions SW and the bottom portion BP to house the display panel 520 and the backlight assembly 500. In the present embodiment, the bottom portion BP may have a rectangular plate shape having a long side in a first direction D1 and a short side in a second direction D2 substantially perpendicular to the first direction D1. The multiple sidewall portions SW may be connected to the bottom portion BP in a one-to-one correspondence with four sides of the bottom portion BP. For example, a first sidewall portion may be connected to a first side of the bottom portion BP, and a second sidewall portion may be connected to a second side of the bottom portion BP.

The multiple sidewall portions SW may extend in a direction towards the cover member 510 from the bottom portion BP. For example, each of the multiple sidewall portions SW may extend in a third direction D3 substantially perpendicular to the bottom portion BP. The third direction D3 may also be substantially perpendicular to the first and second directions D1 and D2.

The backlight assembly 500 emits light towards the display panel 520. In the present embodiment, the backlight assembly 500 includes a light emitting unit 100, a reflective member 570, a light guide plate 550, and an optical member 540.

Figure 3A:
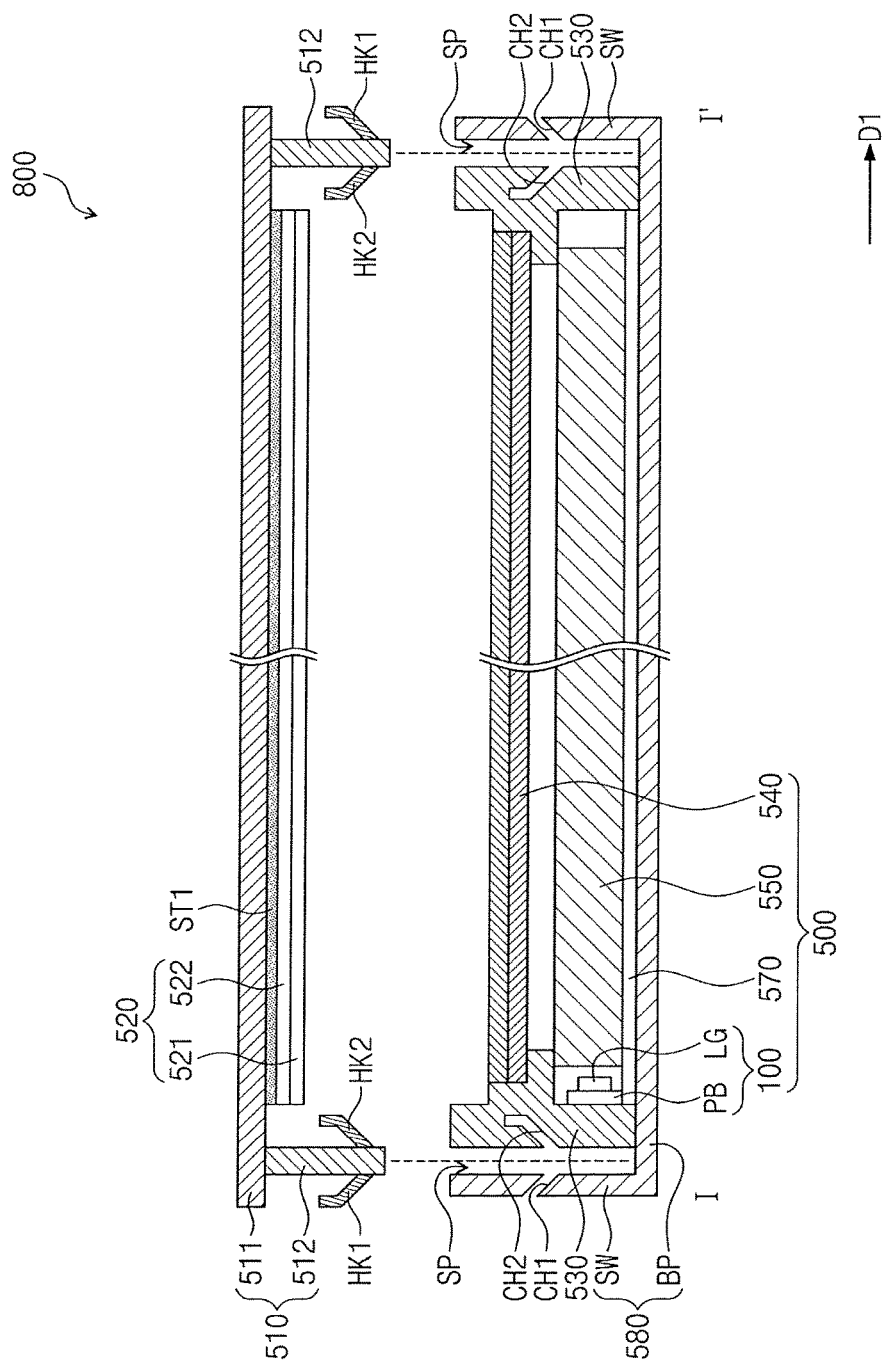
FIG. 3A is an exploded cross-sectional view illustrating the cover member, a housing member and a mold frame taken along line I-I' of FIG. 1 according to an exemplary embodiment of the present inventive concept.

The light emitting unit 100 emits light. In the present embodiment, the light emitting unit 100 may include a printed circuit board PB and multiple light emitting diodes LG mounted on the printed circuit board PB to emit light, as illustrated in FIG. 3A. The printed circuit board PB may extend along one side surface of the light guide plate 550, and the multiple light emitting diodes LG may be mounted on the printed circuit board PB and arranged in a longitudinal direction of the printed circuit board PB. For example, the printed circuit board PB may be arranged in the second direction D2. Thus, the light emitted from the multiple light emitting diodes LG may be incident to the light guide plate 550 through the side surface of the light guide plate 550.

The reflective member 570 has light reflectivity, and is housed in the housing member 580. In the present embodiment, composition materials of the reflective member 570 may include polyethylene terephthalate (PET) and polyester. Accordingly, light leaking through a rear surface of the light guide plate 550 may be reflected towards the light guide plate 550 by the reflective member 570.

In the present embodiment, the reflective member 570 may be a sheet and have a rectangular shape. However, the inventive concept is not limited to the structure of the reflective member 570. In an exemplary embodiment of the present inventive concept, the reflective member 570 may include a reflective material such as silver (Ag) and may be coated on the rear surface of the light guide plate 550.

The light guide plate 550 may be disposed between the reflective member 570 and the optical member 540. The light generated from the light emitting unit 100 is incident to the light guide plate 550, and the light guide plate 550 guides the incident light towards the display panel 520.

The optical member 540 is disposed between the display panel 520 and the light guide plate 550. In the present embodiment, the optical member 540 may include a prism sheet and a diffusion sheet that control the travelling direction of light which is emitted from the light guide plate 550, and then, incident towards the display panel 520.

The mold frame 530 is coupled to the housing member 580, and the mold frame 530 extends along edge portions of the light guide plate 550 to be coupled to the edge portions of the light guide plate 550. As an example, the mold frame 530 may have a rectangular shape with an opening. An inner portion of the mold frame 530 that faces the opening may have a stepped portion having a step-wise shape. The optical member 540 and display panel 520 may be disposed on the stepped portion. The stepped portion of the mold frame 530 may be formed on at least one of the inner sidewalls of the mold frame 530.

The cover member 510 is positioned at the outermost portion of the display device 800 to cover the display panel 520. An opening OP corresponding to the display area DA is provided in the cover member 510 so that an image displayed on the display area DA of the display panel 520 may be exposed to the outside through the opening OP.

In the present embodiment, the cover member 510 includes a cover unit 511 and multiple coupling portions 512.

The cover unit 511 overlaps the non-display area NDA of the display panel 520 to cover the non-display area NDA. For example, the cover unit 511 has a closed-loop shape, when viewed in planar fashion, and overlaps the non-display area NDA. For example, the cover unit 511 may have four rectangular strips that overlap the non-display area NDA, but expose the display area DA. The multiple coupling portions 512 are connected to the cover unit 511, and each of the multiple coupling portions 512 extends in a direction opposite to the third direction D3 to face the bottom portion BP of the housing member 580.

The adhesive member ST1 is disposed between the display panel 520 and the cover member 510 to bond the display panel 520 to the cover member 510. For example, the adhesive member ST1 is disposed between the cover unit 511 of the cover member 510 and the display panel 520 such that the display panel 520 is bonded to a rear surface BS1 of the cover unit 511 by the adhesive member ST1. The rear surface BS1 of the cover unit 511 may face the bottom portion BP of the housing member 580.

In the present embodiment, the adhesive member ST1 may be a double-sided tape including a polymer material. However, the inventive concept is not limited thereto. For example, in an exemplary embodiment of the present inventive concept, the adhesive member ST1 may include a photo-curable resin.

In the present embodiment, the cover member 510 may include first coupling protrusions HK1 and second coupling protrusions HK2. The first coupling protrusions HK1 may be disposed on a surface at which each of the multiple coupling portions 512 faces a sidewall portion SW of the housing member 580. The second coupling protrusions HK2 may be disposed on a surface at which each of the multiple coupling portions 512 faces the mold frame 530.

Further, first coupling grooves CH1 may be provided in the sidewall portions SW of the housing member 580 in a one-to-one correspondence with the first coupling protrusions HK1. Second coupling grooves CH2 may be provided in the mold frame 530 in a one-to-one correspondence with the second coupling protrusions HK2. The first coupling grooves CH1 may house the first coupling protrusions HK1 in a one-to-one correspondence so that the cover member 510 may be coupled to the housing member 580, and the second coupling grooves CH2 may house the second coupling protrusions HK2 in a one-to-one correspondence so that the cover member 510 may be coupled to the mold frame 530. Further description thereof will be made with reference to FIGS. 3A, 3B, 4A and 4B.

Figure 3B:
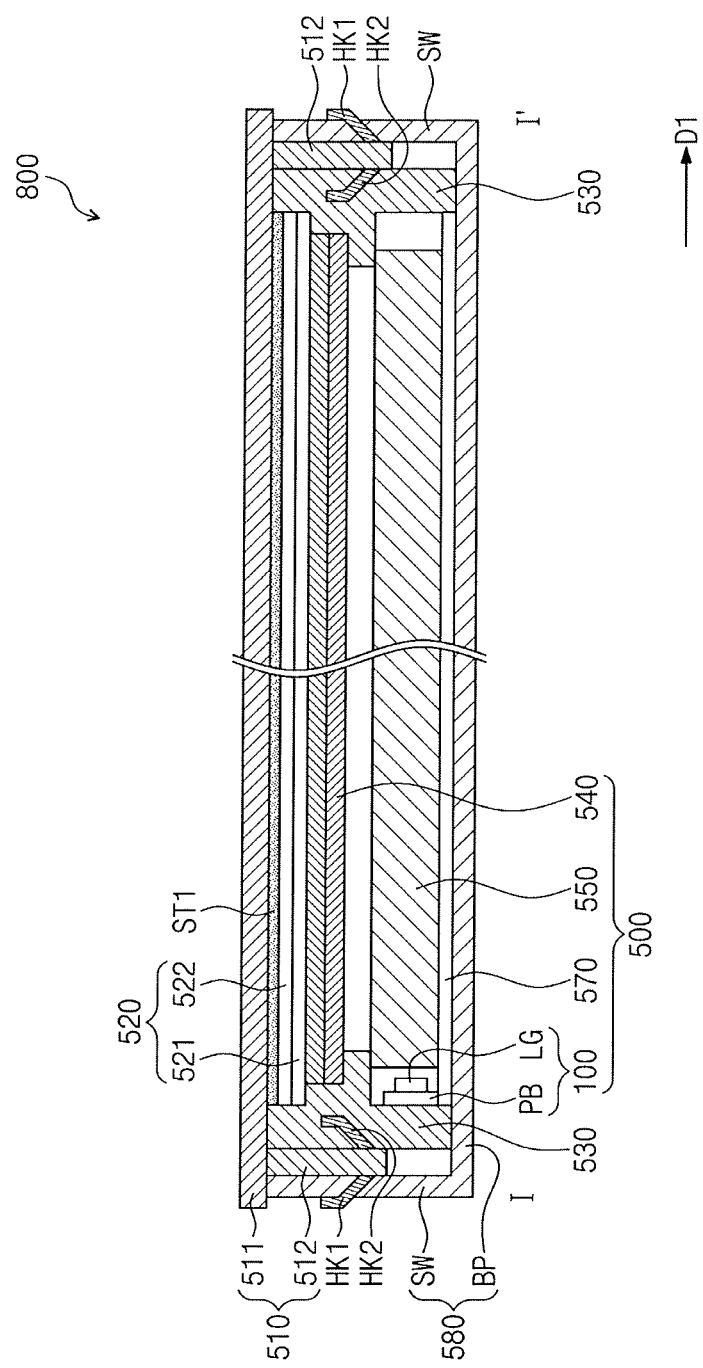
FIG. 3B is a cross-sectional view illustrating a coupling state between the cover member, the housing member and the mold frame of FIG. 3A according to an exemplary embodiment of the present inventive concept.
Figure 4A:
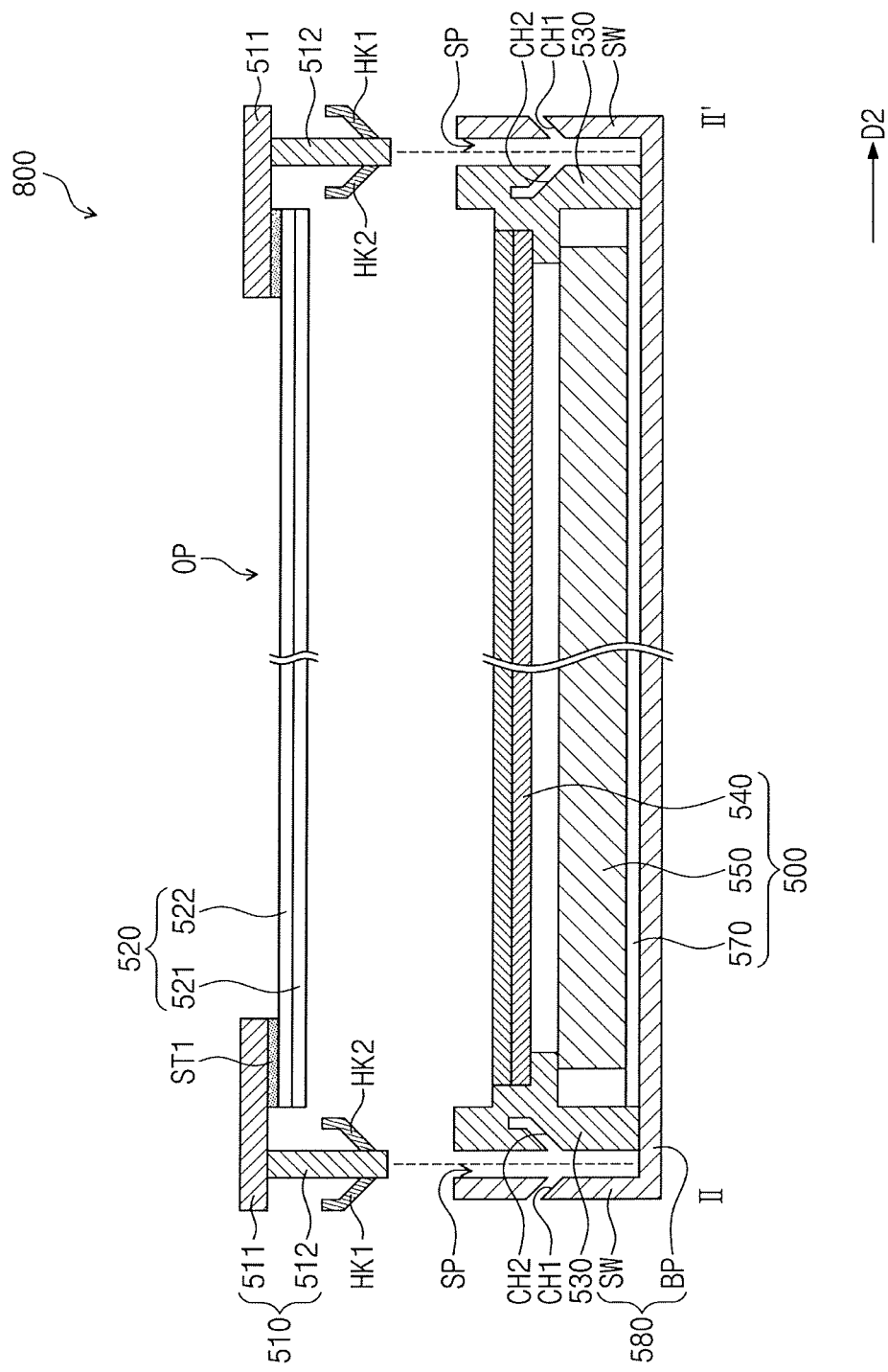
FIG. 4A is an exploded cross-sectional view of the cover member, the housing member and the mold frame taken along line of FIG. 1 according to an exemplary embodiment of the present inventive concept.
Figure 4B:
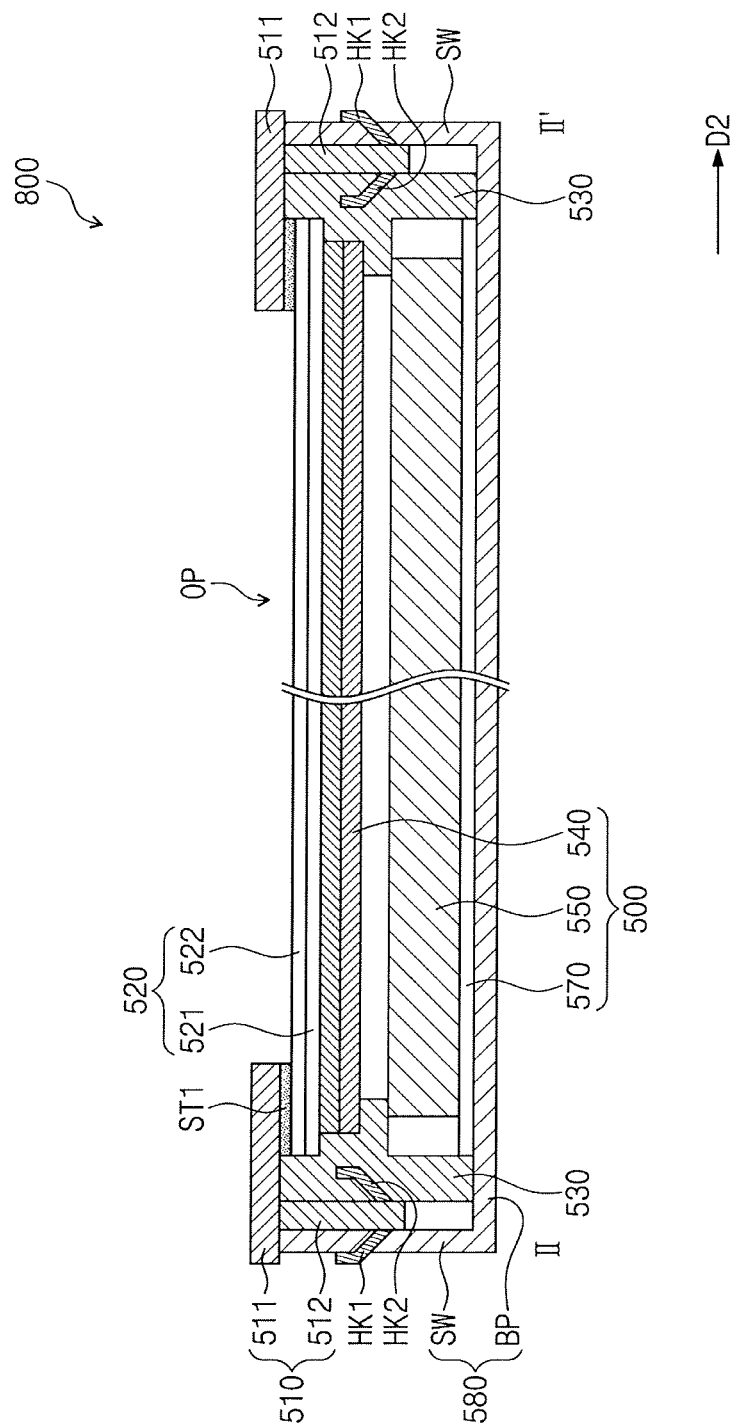
FIG. 4B is a cross-sectional view illustrating a coupling state between the cover member, the housing member and the mold frame of FIG. 4A according to an exemplary embodiment of the present inventive concept.

FIG. 3A is an exploded cross-sectional view illustrating the cover member 510, the housing member 580 and the mold frame 530 taken along line I-I' of FIG. 1. FIG. 3B is a cross-sectional view illustrating a coupling state between the cover member 510, the housing member 580 and the mold frame 530 of FIG. 3A according to an exemplary embodiment of the present inventive concept. In addition, FIG. 4A is an exploded cross-sectional view of the cover member 510, the housing member 580 and the mold frame 530 taken along line II-II' of FIG. 1 according to an exemplary embodiment of the present inventive concept. FIG. 4B is a cross-sectional view illustrating a coupling state between the cover member 510, the housing member 580 and the mold frame 530 of FIG. 4A according to an exemplary embodiment of the present inventive concept.

Referring to FIGS. 3A, 3B, 4A and 4B, as previously explained with reference to FIGS. 2A and 2B, the display panel 520 is bonded to the cover member 510 by the adhesive member ST1, and a first structure including the display panel 520 and the cover member 510 is coupled to a second structure including the backlight assembly 500, the mold frame 530 and the housing member 580.

Before the first structure is coupled to the second structure, a sidewall portion SW of the housing member 580 and the mold frame 530 are spaced apart from each other from one side of the second structure along the first direction D1, e.g., the longitudinal direction of the display panel 520. Further, a space SP is provided between the sidewall portion SW and the mold frame 530. For example, as shown in FIG. 3A, the space is disposed at opposite sides of the mold frame 530. Further, when the first structure is coupled to the second structure, a coupling portion 512 of the cover member 510 is disposed in the space SP so that the cover member 510 is coupled to the housing member 580 and the mold frame 530. Thus, after the first structure is coupled to the second structure, the cover unit 511 may be disposed on each of the sidewall portion SW and the mold frame 530.

In the present embodiment, the coupling portion 512 of the cover member 510 includes a first coupling protrusion HK1 and a second coupling protrusion HK2. Further, a first coupling groove CH1 is provided in the sidewall portion SW of the housing member 580, and a second coupling groove CH2 may be provided in the mold frame 530. Thus, when the cover member 510 is coupled to the housing member 580 and the mold frame 530, the first coupling protrusion HK1 is disposed in the first coupling groove CH1, and the second coupling protrusion HK2 is disposed in the second coupling groove CH2.

In the present embodiment, each of the first and second coupling protrusions HK1 and HK2 may have a shape similar to a hook, and each of the first and second coupling grooves CH1 and CH2 may have an aperture into which the hook may be inserted. However, the inventive concept is not limited to the shape of each of the first and second coupling protrusions HK1 and HK2. For example, in an exemplary embodiment of the present inventive concept, each of the first and second coupling protrusions HK1 and HK2 may have a shape of a convex part protruding as a hemispherical shape, and each of the first and second coupling grooves CH1 and CH2 may have a shape of concave part (e.g., a recessed portion) to house the convex part.

Figure 5A:
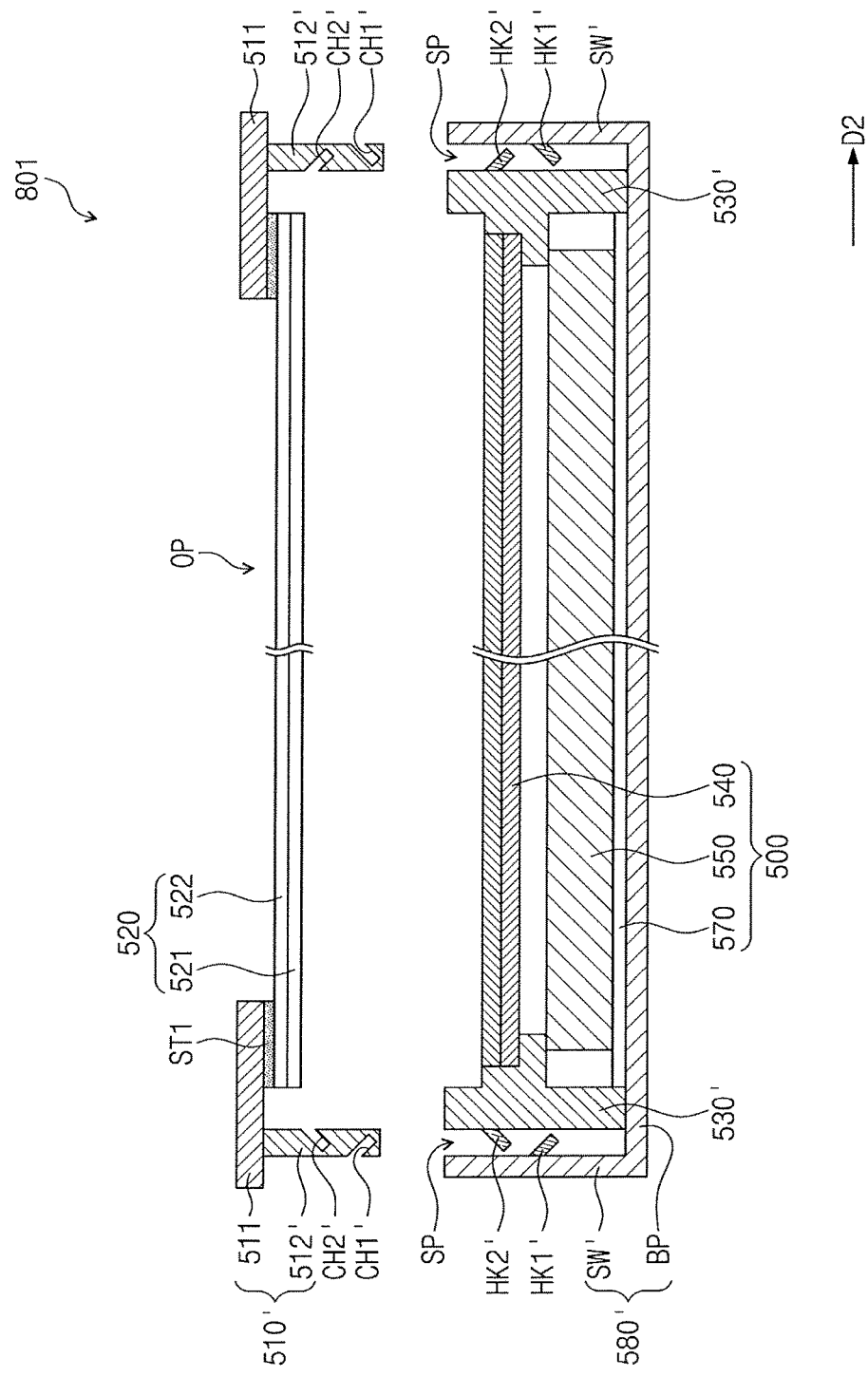
FIG. 5A is an exploded cross-sectional view of a cover member, a housing member and a mold frame of a display device according to an exemplary embodiment of the present inventive concept.
Figure 5B:
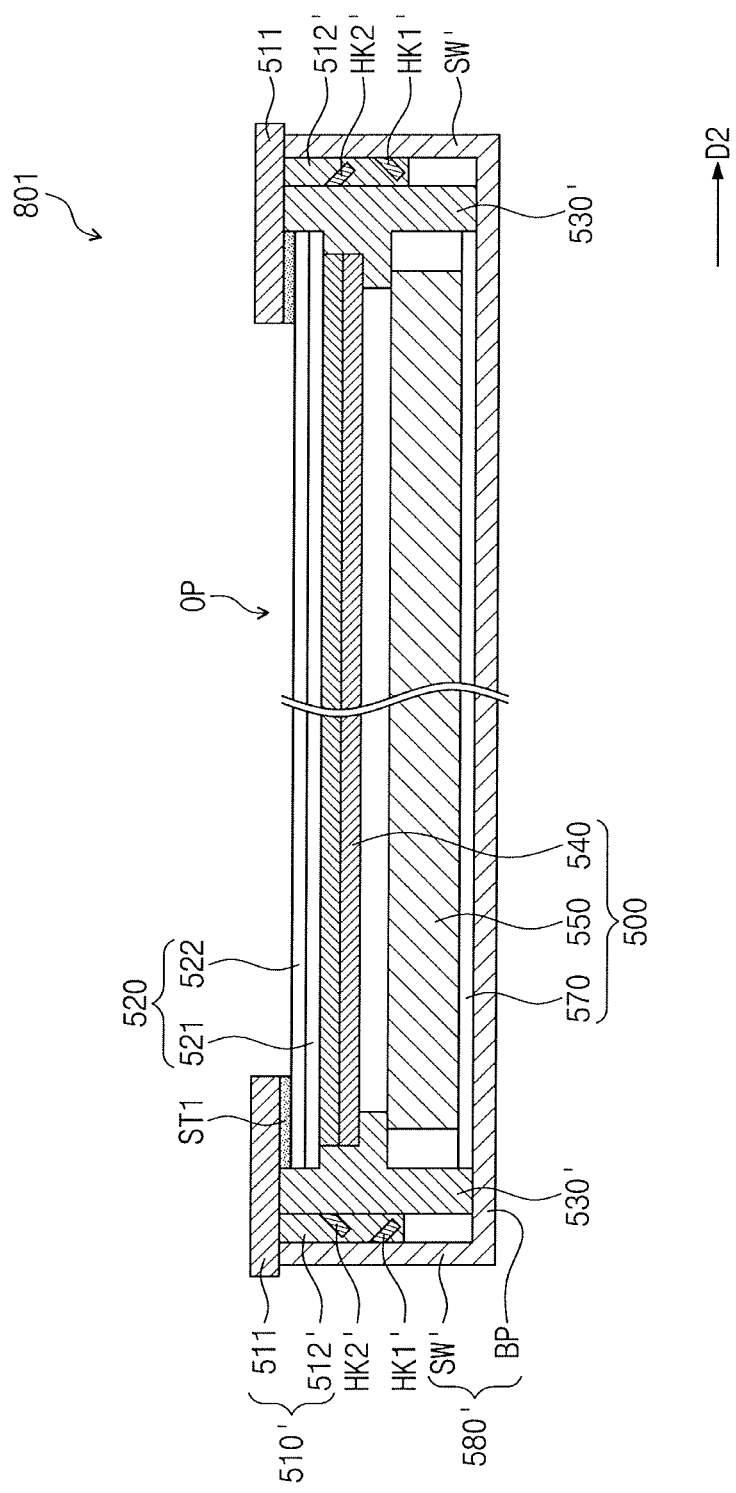
FIG. 5B is a cross-sectional view illustrating a coupling state between the cover member, the housing member and the mold frame illustrated in FIG. 5A according to an exemplary embodiment of the present inventive concept.

FIG. 5A is an exploded cross-sectional view of a cover member 510', a housing member 580' and a mold frame 530' of a display device 801 according to an exemplary embodiment of the present inventive concept. FIG. 5B is a cross-sectional view illustrating a coupling state between the cover member 510', the housing member 580', and the mold frame 530' illustrated in FIG. 5A according to an exemplary embodiment of the present inventive concept. In addition, the location of a cross section of the display device 801 illustrated in FIGS. 5A and 5B may correspond to the location of the cross section of the display device (e.g., 800 in FIG. 1) illustrated in FIG. 1 taken along line II-II'. In describing FIGS. 5A and 5B, the same reference numerals are given to the same elements described above, and duplicate descriptions thereof may be omitted.

Referring to FIGS. 5A and 5B, the display device 801 includes a display panel 520, a cover member 510', a housing member 580', a backlight assembly 500, a mold frame 530', and an adhesive member ST1.

In the present embodiment, a coupling portion 512' of the cover member 510' is disposed in a space SP between a sidewall portion SW' of the housing member 580' and the mold frame 530', and thus, the cover member 510' is coupled to the housing member 580' and the mold frame 530'.

In the present embodiment, the sidewall portion SW' of the housing member 580' includes a first coupling protrusion HK1', and the mold frame 530' includes a second coupling protrusion HK2'. In addition, a first coupling groove CH1' housing the first coupling protrusion HK1' may be provided in a side of the coupling portion 512' facing the sidewall portion SW', and a second coupling groove CH2' housing the second coupling protrusion HK2' may be provided in a side of the coupling portion 512' opposite to that of the first coupling groove CH1'.

Thus, the cover member 510' coupled to the display panel 520 may be safely coupled to the housing member 580' and the mold frame 530' by respectively connecting the first and second coupling protrusions HK1' and HK2' to the first and second coupling grooves CH1' and CH2'.

Figure 6A:
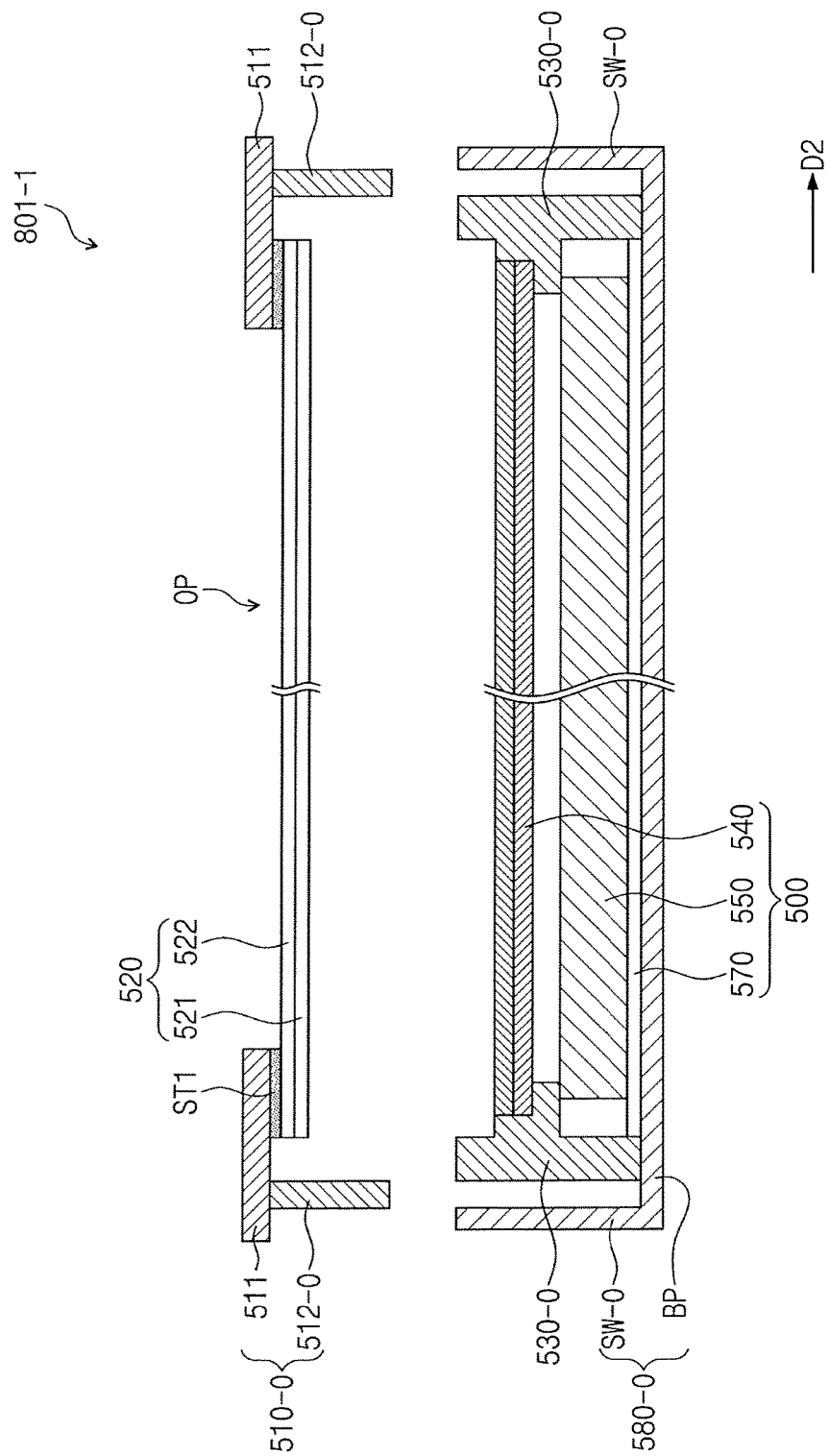
FIG. 6A is an exploded cross-sectional view of a cover member, a housing member and a mold frame of a display device according to an exemplary embodiment of the present inventive concept.
Figure 6B:
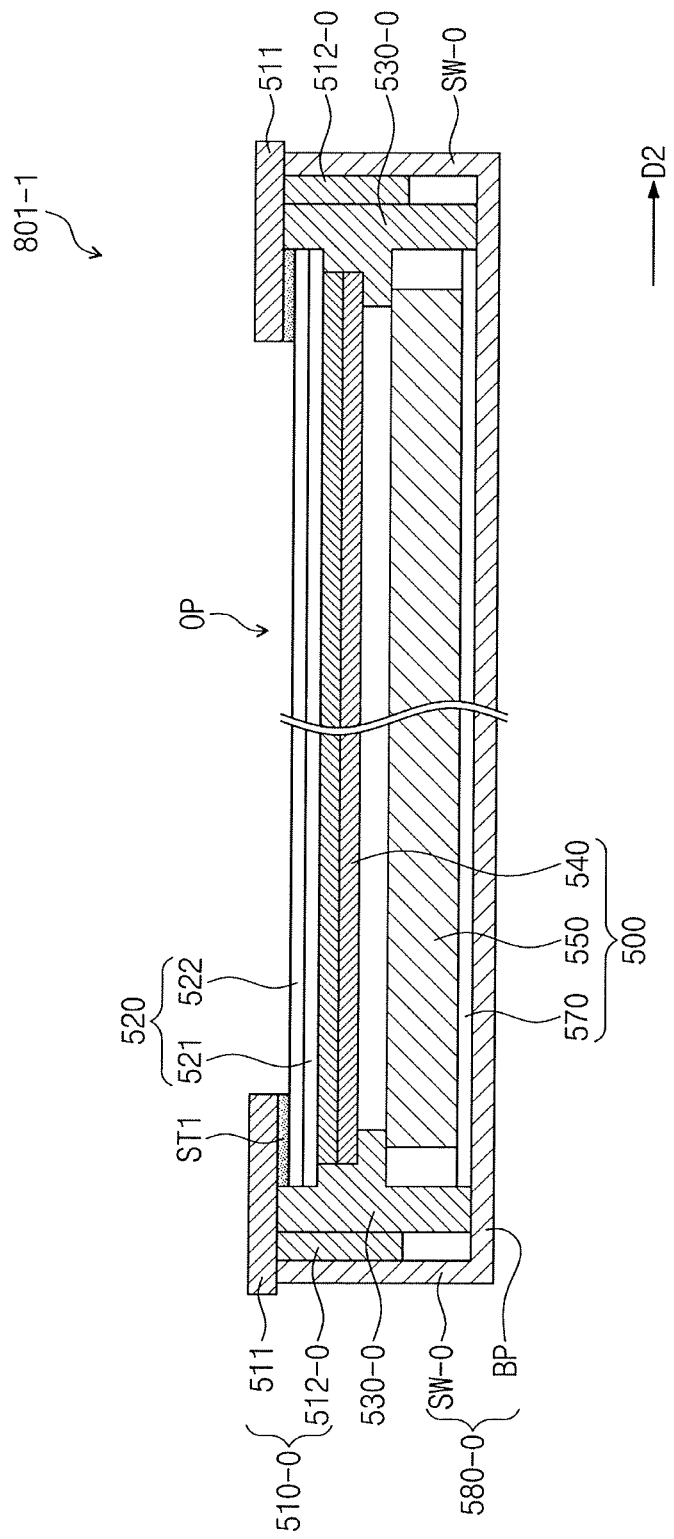
FIG. 6B is a cross-sectional view illustrating a coupling state between the cover member, the housing member and the mold frame illustrated in FIG. 6A according to an exemplary embodiment of the present inventive concept.

FIG. 6A is an exploded cross-sectional view of a cover member 510-0, a housing member 580-0 and a mold frame 530-0 of a display device 801-1 according to an exemplary embodiment of the present inventive concept. FIG. 6B is a cross-sectional view illustrating a coupling state between the cover member 510-0, the housing member 580-0 and the mold frame 530-0 illustrated in FIG. 6A according to an exemplary embodiment of the present inventive concept. In describing FIGS. 6A and 6B, the same reference numerals are given to the same elements described above, and duplicate descriptions thereof may be omitted.

As in the embodiment of the present inventive concept described with reference with FIGS. 4A and 4B, in this embodiment of the inventive concept, a space is provided between a sidewall portion SW-0 of the housing member 580-0 and the mold frame 530-0, and a coupling portion 512-0 of the cover member 510-0 is disposed in the space. Thus, the cover member 510-0 and the display panel 520 bonded to the cover member 510-0 may be coupled to the housing member 580-0 and the mold frame 530-0.

In the present embodiment, to increase the coupling force between the cover member 510-0, the housing member 580-0 and the mold frame 530-0, an adhesive resin may be filled in the space in which the coupling portion 512-0 of the cover member 510-0 is disposed.

Figure 7B:
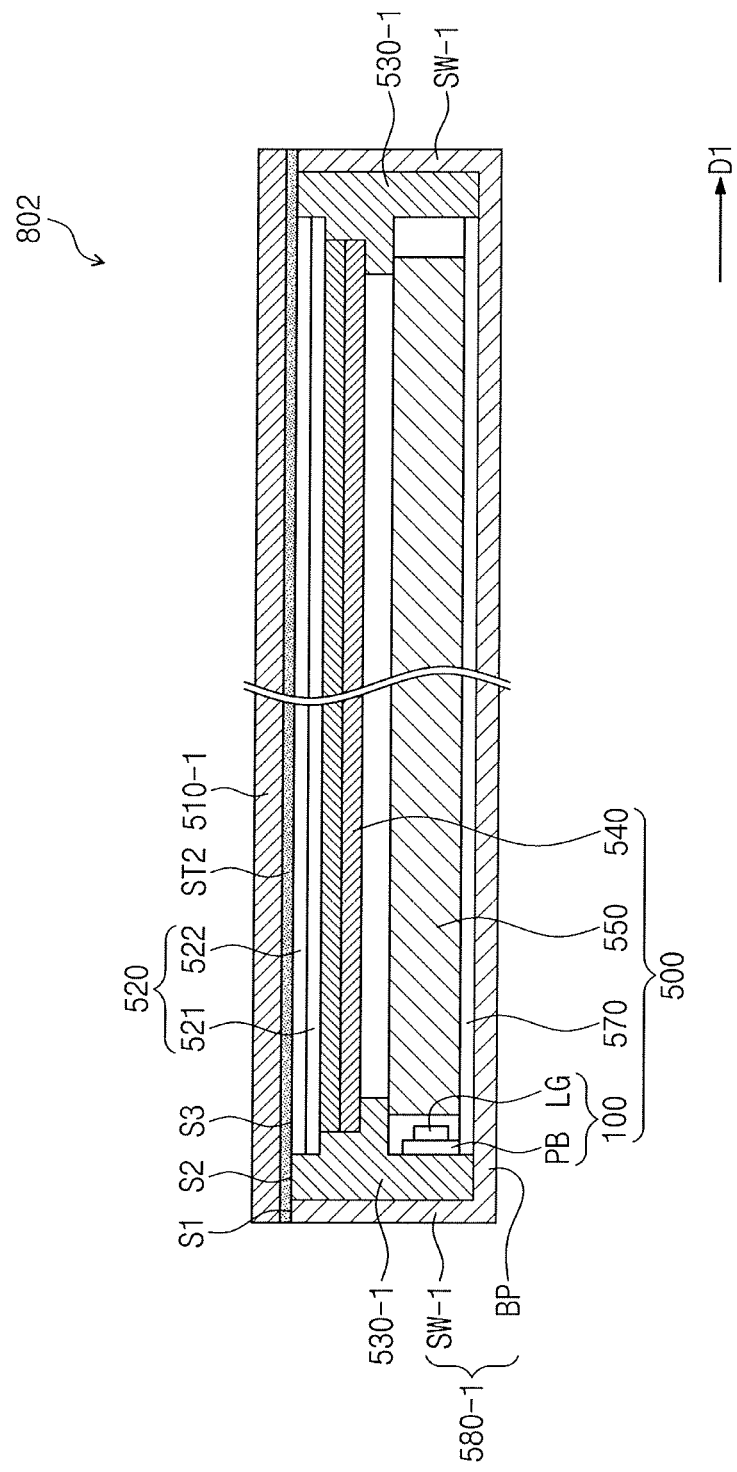
FIG. 7B is a cross-sectional view illustrating a coupling state between the cover member, the housing member and the mold frame of FIG. 7A according to an exemplary embodiment of the present inventive concept.
Figure 8A:
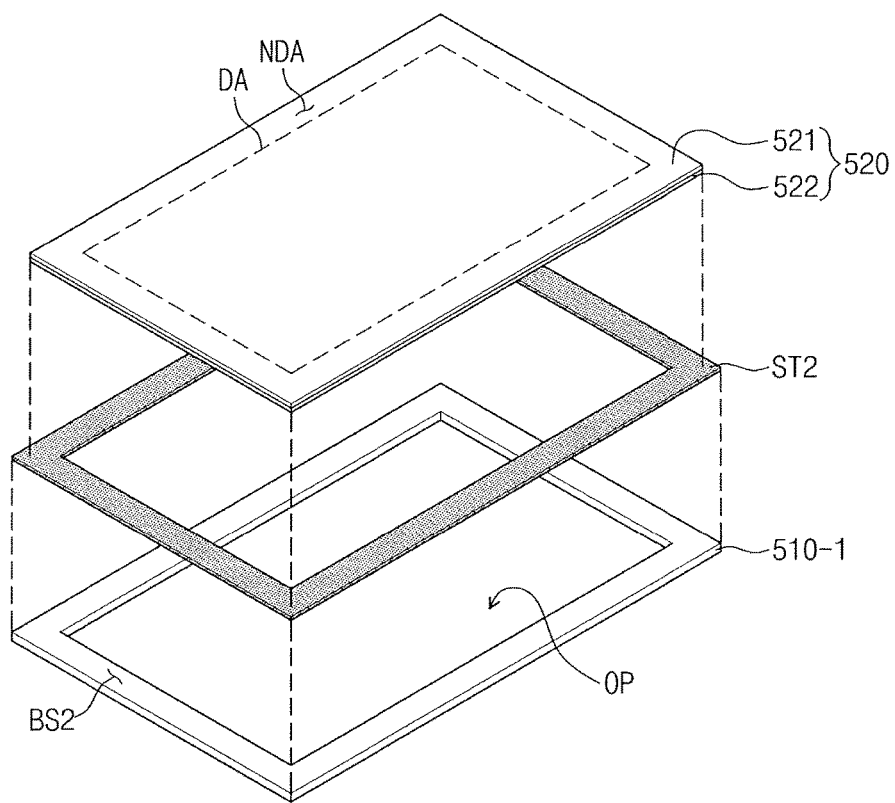
FIG. 8A is a perspective view between the display panel and the cover member of FIG. 7A according to an exemplary embodiment of the present inventive concept.
Figure 8B:
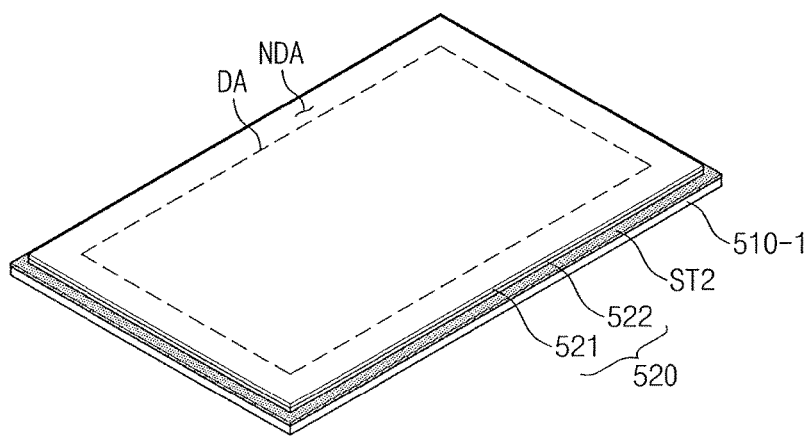
FIG. 8B is a view showing a coupling state between the display panel and the cover member of FIG. 8A according to an exemplary embodiment of the present inventive concept.

FIG. 7A is an exploded cross-sectional view of a cover member 510-1, a housing member 580-1, and a mold frame 530-1 of a display device 802 according to an exemplary embodiment of the present inventive concept. FIG. 7B is a cross-sectional view illustrating a coupling state between the cover member 510-1, the housing member 580-1 and the mold frame 530-1 illustrated in FIG. 7A according to an exemplary embodiment of the present inventive concept. In addition, the location of a cross section of the display device 802 illustrated in FIGS. 7A and 7B may correspond to the location of a cross section of the display device (e.g., 800 of FIG. 1) illustrated in FIG. 1 taken along line I-I'. In addition, FIG. 8A is a perspective view between the display panel 520 and the cover member 510-1 illustrated in FIG. 7A according to an exemplary embodiment of the present inventive concept. FIG. 8B is a view showing a coupling state between the display panel 520 and the cover member 510-1 illustrated in FIG. 8A according to an exemplary embodiment of the present inventive concept.

Referring to FIGS. 7A, 7B, 8A and 8B, the display device 802 includes a display panel 520, a cover member 510-1, a housing member 580-1, a backlight assembly 500, a mold frame 530-1, and an adhesive member ST2.

In the present embodiment, an opening OP corresponding to a display area DA of the display panel 520 is provided in the cover member 510-1, and the cover member 510-1 overlaps a non-display area NDA of the display panel 520 to cover the non-display area NDA.

In the embodiment described with reference to FIGS. 2A and 2B, the cover member (e.g., 510 of FIG. 2A) includes the cover unit (e.g., 511 of FIG. 2A) and the coupling portion (e.g., 512 of FIG. 2A), but in the embodiment of the present inventive concept illustrated in FIGS. 8A and 8B, the opening OP is provided in the cover member 510-1. Thus, the cover member 510-1 may have a flat shape extending along the first direction D1 which is a longitudinal direction of the display panel 520.

The adhesive member ST2 is disposed between each of the display panel 520, the housing member 580-1, and the mold frame 530-1 and the cover member 510-1. For example, the display panel 520 is fixed to a rear surface BS2 of the cover member 510-1 by the adhesive member ST2, a sidewall portion SW-1 of the housing member 580 is fixed to the rear surface BS2 of the cover member 510-1 by the adhesive member ST2, and an upper end of the mold frame 530-1 is fixed to the rear surface BS2 of the cover member 510-1 by the adhesive member ST2.

In relation to a method of assembling the display device 802, a first structure including the display panel 520 and the cover member 510 may be coupled to a second structure including the backlight assembly 500, the mold frame 530-1 and the housing member 580-1 to thereby complete the assembly of the display device 802. For example, the adhesive member ST2 bonded to the cover member 510-1 is bonded to the sidewall portion SW-1 of the housing member 580 and the mold frame 530-1, respectively before the first structure and the second structure are bonded to each other. Thus, an upper surface S1 of the sidewall portion SW-1 and an upper surface S2 of the mold frame 530-1 may be coplanar. In other words, the upper surfaces S1 and S2 may be located on the same plane. In addition, after the first structure and the second structure are bonded to each other, the upper surface S1 and the upper surface S2 may be coplanar with an upper surface S3 of the display panel 520. In other words, the upper surface S3 may be on the same plane with the upper surfaces S1 and S2.

As described as above, when the first structure and the second structure are bonded to each other using the adhesive member ST2, an assembly process between the first and second structures may become simplified, and the structure of each of the cover member 510-1, the housing member 580-1 and the mold frame 530-1 may become simpler.

According to an exemplary embodiment of the present inventive concept, a display panel is bonded to a cover member using an adhesive member, and the cover member and the display panel that are bonded to each other by the adhesive member may be assembled with a backlight assembly to produce a display device. According to an exemplary embodiment of the present inventive concept, it is easy to assemble components that make the display device. Accordingly, the ability to assemble components constituting a display device which includes a display panel and a backlight assembly may be improved, and an overall structure of the display device may become simplified.

While the present inventive concept has been particularly shown and described with reference to exemplary embodiments thereof, it will be apparent to those of ordinary skill in the art that various changes in form and detail may be made thereto without departing from the spirit and scope of the present inventive concept as defined by the claims.

What is claimed is:

1. A display device comprising:
 a display panel having a display area which displays an image and a non-display area positioned around the display area;
 a backlight assembly which emits light towards the display panel;
 a housing member which houses the backlight assembly;
 a cover member having an opening portion corresponding to the display area, and which covers a portion of the display panel; and
 a mold frame coupled to the housing member,
 wherein the display panel is bonded to the cover member, and at least a portion of the cover member is disposed in a space between the housing member and the mold frame, to couple the cover member to the housing member and the mold frame.

2. The display device of claim 1, further comprising an adhesive member disposed between the display panel and the cover member to bond the display panel to the cover member.

3. The display device of claim 2, wherein the housing member comprises:
 a bottom portion; and
 a sidewall portion connected to the bottom portion, and the cover member comprises:
 a cover portion covering the non-display area of the display panel; and
 a coupling portion connected to the cover portion, extending towards the bottom portion of the housing member, and coupled to the sidewall portion.

4. The display device of claim 3, wherein the adhesive member bonds a portion of the display panel corresponding to the non-display area to a surface of the cover portion.

5. The display device of claim 3, wherein the coupling portion is disposed in the space between the housing member and the mold frame, wherein the space is between the sidewall portion of the housing member and the mold frame.

6. The display device of claim 5, wherein one of the coupling portion of the cover member and the sidewall portion of the housing member comprises a coupling protrusion, and the other one of the coupling portion of the cover member and the sidewall portion of the housing member has a coupling groove which accommodates the coupling protrusion.

7. The display device of claim 5, wherein one of the coupling portion of the cover member and the mold frame comprises a coupling protrusion, and the other one of the coupling portion of the cover member and the mold frame has a coupling groove which accommodates the coupling protrusion.

8. The display device of claim 3, wherein the sidewall portion of the housing member, the coupling portion of the cover member, and the mold frame are sequentially arranged along a longitudinal direction of the display panel when viewed in a cross section.

9. The display device of claim 3, wherein when viewed in a cross section, the cover portion of the cover member extends along a longitudinal direction of the display panel and the cover portion of the cover member is disposed on an end of each of the sidewall portion and the mold frame.

10. A display device comprising:
   a display panel having a display area which displays an image and a non-display area adjacent to the display area;
   a backlight assembly which emits light towards the display panel;
   a housing member which houses the backlight assembly;
   a cover member having an opening portion corresponding to the display area and covering a portion of the display area;
   an adhesive member disposed between the display panel and the cover member; and
   a mold frame coupled to the housing member,
   wherein the cover member is attached to the housing member and the mold frame.

11. The display device of claim 10, wherein the adhesive member is disposed between the cover member and the housing member, and the cover member and the mold frame, and
   wherein each of the housing member and mold frame is attached by the adhesive member.

12. The display device of claim 11, wherein the housing member comprises:
   a base portion; and
   a sidewall portion extending towards the cover member from the base portion, and
   the cover member covers the non-display area of the display panel, and
   wherein the adhesive member is disposed between the cover member and the sidewall portion.

13. The display device of claim 12, wherein the adhesive member bonds a portion of the display panel corresponding to the non-display area to a rear surface of the cover member.

14. The display device of claim 13, wherein the cover member covers an end of the sidewall portion of the housing member and an end of the mold frame.

15. The display device of claim 13, wherein the adhesive member bonds an upper surface of the sidewall portion of the housing member to the rear surface of the cover member, and the adhesive member bonds an upper surface of the mold frame to the rear surface of the cover member.

16. The display device of claim 15, wherein an upper surface of the display panel, the upper surface of the sidewall portion, and the upper surface of the mold frame are located on the same plane when viewed in a cross section.

17. The display device of claim 12, wherein the cover member has a flat shape along a longitudinal direction of the display panel.

18. A display device comprising:
   a display panel having a display area and a non-display area;
   a housing member;
   a backlight assembly disposed in the housing member;
   a cover member including a cover portion and coupling portion, wherein the cover portion overlaps edges of the display panel and includes an opening, and the coupling portion is connected to and extended away from the cover portion; and
   a mold frame disposed in the housing member,
   wherein the coupling portion is disposed between the housing member and the mold frame to couple the housing member to the mold frame.

19. The display device of claim 18, wherein the display panel is exposed through the opening in the cover portion of the cover member.

20. The display device of claim 18, wherein the coupling portion includes a first coupling protrusion and a second coupling protrusion, the housing member includes a first coupling groove, and the mold frame includes a second coupling groove, wherein the first coupling protrusion is configured to be disposed in the first coupling groove and the second coupling protrusion is configured to be disposed in the second coupling groove.

* * * * *